United States Patent [19]

Krajec et al.

[11] Patent Number: 4,483,814
[45] Date of Patent: Nov. 20, 1984

[54] METHOD AND APPARATUS FOR FORMING STRETCHED RESIN SHEET

[75] Inventors: Otmar Krajec; Walter Hellmann, both of Rossdorf, Fed. Rep. of Germany

[73] Assignee: Röhm GmbH, Darmstadt, Fed. Rep. of Germany

[21] Appl. No.: 499,292

[22] Filed: May 31, 1983

[30] Foreign Application Priority Data

Jun. 4, 1982 [DE] Fed. Rep. of Germany ....... 3221100

[51] Int. Cl.³ .............................................. B29C 17/02
[52] U.S. Cl. .................................... 264/230; 264/291; 425/383
[58] Field of Search ................ 264/291, 292, 322, 230; 425/383, 384

[56] References Cited

U.S. PATENT DOCUMENTS

| | | | |
|---|---|---|---|
| 2,577,620 | 12/1951 | Mahler | 264/291 |
| 2,702,406 | 2/1955 | Reed | 264/291 |
| 3,020,596 | 2/1962 | Clapp et al. | 264/322 |
| 3,175,027 | 3/1965 | Harrison | 264/230 |
| 3,894,137 | 7/1975 | Moenck | 264/230 |
| 4,302,417 | 11/1981 | Michelothi | 425/383 |
| 4,371,575 | 2/1983 | Kerk et al. | 264/230 |

Primary Examiner—James Lowe
Attorney, Agent, or Firm—Curtis, Morris & Safford

[57] ABSTRACT

A rigid, one-piece, thin-walled shaped body of stretched plastic whose edge is not in one plane and which has a surface approximating the mathematical minimal surface is disclosed which can be produced with increased dimensional accuracy. A plane plate made of a biaxially stretched plastic at least 1 mm thick is caused to assume a shape which is not in one plane, for example, the shape of a semicylindrical surface, and the edge of the plate is fixed or held in that position. On being heated to a temperature in the thermoelastic range, the surface partially shrinks back and results in a shape approximating the minimal surface, while back-shrinkage of the edge is prevented by its being held in a fixed position. Opposite portions of the fixed edge, between which the plastic plate extends rectilinearly, before backshrinkage of the plastic plate sets in, are spaced farther apart after heating and then fixed anew prior to cooling. In this way dimensional inaccuracies due to stresses are compensated after the means holding the plate edge are released.

6 Claims, 1 Drawing Figure

U.S. Patent Nov. 20, 1984 4,483,814
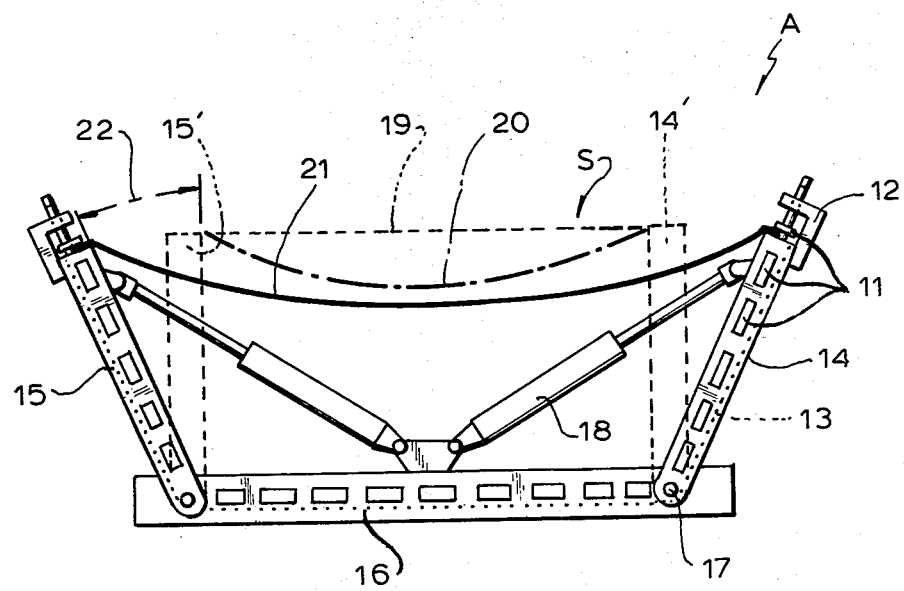

METHOD AND APPARATUS FOR FORMING STRETCHED RESIN SHEET

The invention relates to a method for making a rigid, one-piece, thin-walled shaped body of stretched synthetic resin, the edge of which body is not in one plane and the surface of which is smaller than the imaginary flat initial surface which is enclosed by its edge, and to an apparatus for carrying out said method.

Rigid, one-piece, biaxially stretched shaped bodies of synthetic resin and a method of manufacturing them are known from published international patent application WO 81/01304 patented in the United States as U.S. Pat. No. 4,371,575. In this prior art method, a planar sheet of a biaxially stretched synthetic resin having a thickness of at least 1 mm is deformed by bringing the edge of the sheet into a position which is not in one plane and fixing it in that position, then heating the surface enclosed by the edge to the thermoelastic state and allowing it to shrink back partially while back-shrinkage of the edge of the sheet is prevented by its being fixed in position. For example, the planar sheet of biaxially stretched plastic may be elastically curved to form a semicylindrical tunnel and the edge of the plate fixed in that position by suitable means. Now, when the surface enclosed by the edge is heated to a temperature in the thermoelastic range, a saddle-like surface is formed with partial back-shrinkage while the edge remains in its fixed position. After cooling at a temperature below the softening temperature, the fixing means can be released and the rigid, one-piece shaped body obtained can be removed from the production apparatus.

In the commercial manufacture of such shaped bodies, problems of dimensional stability have arisen. Although the edge is held stationary throughout the production process, it has been found that, after removal from the production apparatus, the tunnel elements mentioned earlier are shorter at the vertex than at the base, with both distances measured in the longitudinal direction of the tunnel. These discrepancies can be remedied by subsequent trimming of the edges, or by using from the outset a sheet which is longer along the vertex than along the base. However, this requires additional operations and entails a loss of material.

Closer investigation of the sequence of operations has permitted the cause of the dimensional inaccuracies to be determined. When a biaxially stretched plastic sheet which is fixed in position at its edge is heated to a temperature above its softening temperature, the tensile forces exerted during its production are released in the form of restoring forces which act upon the fixed edge and bring about the saddlelike deformation of the surface area enclosed by the edge. On cooling to a temperature below the softening temperature, the released restoring forces are not completely refrozen; rather, a force corresponding to the elastic elongation of the now cold resin continues to act upon the fixed edge. When the fixing means are released, the edge of the plate yields to that elastic force and is deflected from the original fixed position. This effect is particularly pronounced at the vertex of the tunnel element because the elastic forces which act in the longitudinal direction of the tunnel are reinforced by forces acting in a direction transverse thereto which have the effect of further lowering the saddle surface. As a result of the anticlastic curvature of the surface of the shaped body, these transverse forces exert a contraction force on the vertex at the tunnel entrances.

The object of the invention is to avoid the described dimensional inaccuracies through an improved method and an improved apparatus for the product of such rigid, one-piece, thin-walled shaped resin bodies without loss of material and without additional trimming work.

In the present specification and claims, the term "plane" refers to a geometric surface in which any desired numberof straight lines can extend through any point. This definition coincides with general usage. In contrast, the term "flat" refers to a geometric surface in which at least one straight line can be placed through any desired point. In other words, it is not a plane within the meaning of the term in common usage but a cylindrical surface, a conical surface, or a saddle-roof surface, for example. Flat surfaces of this type can be generated from a plane (as defined above) by curving or bending it about one or more axes. The term "initial surface" refers to the surface of a resin body from which the back-shrinkage proceeding in accordance with the invention starts. There is no flat initial surface on the finished shaped body, which is why in that connection one speaks of an "imaginary" flat initial surface.

The "imaginary flat initial surface" of the finished shaped body is generated by the motion of a straight line over the curved or bent edge of the resin sheet.

The surface actually enclosed by the edge is smaller than the "imaginary flat initial surface" and, in the ideal case, represents a mathematical minimal surface. By this is meant the smallest possible surface which can be enclosed by a given edge. Minimal surfaces and the surfaces of the shaped bodies produced in accordance with the invention which approximate such minimal surfaces are anticlastically curved, that is to say at any point they are curved in two different directions normal to each other. This design imparts high buckling resistance to the shaped bodies with respect to forces acting upon individual points thereof.

In accordance with the invention, opposite portions of the fixed edge between which the resin sheet extends rectilinearly before back-shrinkage sets in are, after heating of the sheet to the thermoelastic state, spaced farther apart by overcoming the released restoring forces of the resin and then are again fixed in their new position prior to cooling. The increase in their spacing is determined such that after the resin has cooled and the fixing means have been released, the edge of the sheet recedes to a position which corresponds to the original position of the edge prior to heating to the thermoelastic state. The increase in the spacing which is required can be calculated approximately by Hooke's law. It must approximately correspond to the amount of elongation resulting from the modulus of elasticity of the cooled resin and the restoring force frozen in the stretched resin. However, this calculation makes no allowance for the additive transverse forces mentioned earlier, and thus it is simpler to determine the necessary increase in the spacing by trial and error.

The method in accordance with the invention thus yields shaped bodies whose edge corresponds to the plane initial surface originally used. It therefore eliminates the need for finishing the edge by cutting or for a corresponding pretreatment of the plate used.

The synthetic resin material may consist of stretched sheets of polymethacrylate, polycarbonate, polyvinyl chloride, or other stretchable resin. Polymethacrylate and resins composed predominantly of methyl methacrylate are preferred. The degree of linear stretch along each stretch axis may range from 40 to 120 percent, and preferably ranges from 60 to 90 percent. For the sake of adequate stiffness and strength, the thickness of the plastic sheets used should be at least 1 mm and preferably ranges from 3 to 8 mm. Thicknesses above 10 mm generally are not required. The sheets used may be of practically any size, depending on the shape and size of the shaped body to be produced. As a rule, the size of the sheets used will not be less than one and not more than 20 square meters, the range from 5 to 12 square meters being preferred. Rectangular, and more particularly square, sheets are preferably used.

The dimensional inaccuracies which are prevented by the invention occur particularly at those opposite portions of the edge between which the resin plate extends rectilinearly before back-shrinkage sets in. In the case of tunnel-like shaped bodies, these are the edge portions which bound the tunnel openings. This is why the method of the invention is applied especially to these edges. At the vertex, the dimensional inaccuracies are more pronounced than at the edge portions of the tunnel openings close to the base. In the production of tunnel-like shaped bodies, it is therefore advisable to space the portions of the fixed edge which enclose the tunnel opening farther apart through a tilting motion about the base line of the tunnel opening. In this way, the greatest increase in the spacing is obtained at the vertex, and the least increase near the base.

Dimensional inaccuracies may occur also in the width of the base of tunnel-like shaped bodies. However, these inaccuracies are not detrimental since the structural element is sufficiently elastic in that direction to compensate for dimensional inaccuracies when it is installed in a given opening. For this reason, the measures in accordance with the invention need not be applied at those points.

In producing a tunnel-like shaped body whose imaginary flat initial surface is a semicylindrical surface, a flat or rectangular plastic sheet is elastically curved to form a semicylindrical surface and fixed in that position at its peripheral edge. In that position, the sheet is heated to a temperature in the thermoelastic range, with partial back-shrinkage in the direction of a saddle-like minimal surface then setting in. As shown in the accompanying drawing, the edges enclosing the tunnel opening are spaced farther apart, as required, through a tilting motion about the base line. In that position, the sheet is allowed to cool to below the softening temperature of the resin, the fixing means then being released.

Tunnel-like shaped bodies whose imaginary flat initial surface is curved parabolically or in another manner may be produced in the same way. Tunnel-like shaped bodies whose tunnel openings are bounded by straight lines and bent once or several times can be produced in a similar manner. Several methods may be employed to produce them. For example, the resin sheet used can be heated to a temperature above the softening temperature in one or more narrow zones extending in the longitudinal direction of the tunnel, the sheet then being bent into a tunnel profile. The cold areas next to the heated zones will prevent the latter from shrinking due to the restoring forces. The edges of the bent tunnel so obtained can be fixed in the manner described above. Following this, the same procedure is used as with the semicylindrical initial surfaces. During back-shrinkage, the bend lines in the tunnel surface vanish and all that remains is bend points in the edges at the tunnel openings.

In another method for the production of similar shaped bodies, the starting sheet is fixed in the form of a plane and in that position heated to the thermoelastic state. The fixed edge is then bent on two opposite sides about one or more points, the rest of the procedure being as described above.

The above and other objects features and advantages of the present invention will be apparent in the following detailed description of an illustrated embodiment of the invention when read in connection with the accompanying drawing, wherein:

The single FIGURE is a side elevational view of an apparatus used in accordance with the invention.

In the single FIGURE of the drawing, the solid lines depict the terminal phase of the production process, while conditions at the start of the process are shown by dashed lines. The edge of the resin sheet is indicated by dotted lines. For reasons of clarity, the enlargement of the spacing of the fixed edge portions is shown grossly exaggerated.

Referring more to the drawing in detail, an apparatus A is shown for use in the production of tunnel-like shaped bodies having arcuate tunnel entrances. Means 11 serving to fix the peripheral edge of the resin sheets in position are merely shown schematically in the drawing. Edge 13 of sheets, represented by dotted line, is held to the fixing means 11 by clamps 12. For the sake of clarity, only two clamps 12 are shown, in simplified form. The clamps are of conventional conduction and need not be described in detail. Indeed, commercially available clamps are preferably used in a number sufficient to fix the entire edge of the sheet in place on fixing means as required. Fixing means 11 and clamps 12 are disposed on arcuately shaped holders 14, 15 which are resistant to the restoring forces encountered. These forces may be quite strong and should cause but minor deformation of holders 14, 15. These two arcuate elements are connected by two straight rigid elements or bars 16 (only one of which is seen in the side view of the FIGURE)in a manner so that holders 14, 15 are displaceable relative to each other as required. In the embodiment shown in the drawing, holders 14, 15 are joined through hinge joints 17 to elements 16 to permit holders 14 and 15 to execute a tilting motion. For this purpose, hydraulic cylinders 18, may be used, for example. The cylinders are connected between elements 16 and holders 14, 15 to cause the holders to pivot about joints in between the solid and dashed line positions thereof.

At the start of the operation, arcuate holders 14 and 15 are in the position indicated by dashed lines 14' and 15'. The resin sheet is placed in position on elements 11, curved to conform to holders 14 and fixed in place on holders 14, 15 and elements 16 by clamps 12. The sheet will then be in the position denoted by dashed line 19. The entire apparatus is then placed in a hot-air cabinet to heat the resin to a temperature above its softening temperature. For the processing of polymethacrylate sheet, a temperature from 110° to 120° C. is required. Once the softening temperature is exceeded, partial back-shrinkage causes the sheet to occupy the position indicated by the dot-dash line 20.

Hydraulic cylinders 18 are then be actuated to tilt holders 14' and 15' into the inclined position shown in solid lines at 14, 15, following which the resin is allowed to cool, in the position shown by the heavy solid line 21, to a temperature below its softening temperature. When the fixing means are thereafter released, the finished cold shaped body will assume the final shape indicated by the dot-dashed line 20.

The amount 22 by which arcuate holders 14 and 15 are tilted from their starting position 14' and 15' ranges from about 10 to 15 mm with a length of the base element 16 being about 3 meters and the width at the base of the arcuate elements 14 and 15 being 2.3 meters.

Although an illustrative embodiment of the invention has been described herein with reference to the accompanying drawings, it is to be understood that the invention is not limited to that precise embodiment and that various changes and modifications may be effected therein by one skilled in the art without departing from the scope or spirit of this invention.

What is claimed is:

1. A method for making a rigid, one-piece, thin-walled shaped body of stretched synthetic resin, the edge of which body is not in one plane and the surface of which body is smaller than the imaginary flat initial surface which is enclosed by its edge, which method comprises the steps of deforming a plane sheet of a biaxially stretched synthetic resin having a thickness of at least 1 mm to a shape which is not in one plane and which conforms to said initial surface, fixing the edge of the deformed sheet in the shape so attained, heating the surface of the resin enclosed by the edge to a temperature at which the resin is in a thermoelastic condition, separating opposite portions of the fixed edge between which the resin sheet extends rectilinearly prior to heating by overcoming the restoring force released by heating and allowing the surface enclosed by the fixed edge partially to shrink back, and then cooling the resin to a temperature below its softening point.

2. A method as in claim 1 wherein the distance by which said opposite portions of the fixed edge are separated is approximately equal to the amount of elongation resulting from the modulus of elasticity of the cooled synthetic resin and the restoring force frozen in the stretched synthetic resin.

3. A method as in claim 1 wherein the shaped body produced has a tunnel shape having two tunnel openings and wherein those opposite portions of the fixed edge which enclose the tunnel ppenings are separated by overcoming said restoring force.

4. A method as in claim 3 wherein said separating step comprises the step of tilting those opposite portions of the fixed edge which enclose the tunnel openings about the base line of the tunnel opening.

5. An apparatus for making a rigid, one-piece, thin walled, shaped body of stretched and back-shrunk synthetic resin, said body having an edge which does not lie in one plane and a surface which is smaller than the imaginary flat surface which is enclosed by its edge, which apparatus comprises means, not lying in one plane, for fixing the edge of a resin sheet in a clamped position not lying in one plane, said means including a holder resistant to the restoring forces of the resin encountered when said resin is back-shrunk and having opposing holder portions between which the fixed resin sheet extends rectilinearly prior to back-shrinkage, said opposing holder portions being movably mounted to be displaceable in a direction counter to said restoring forces when the apparatus is actuated, and motion-imparting means connected to said displaceable holder portions for displacing said opposing holder portions to overcome said restoring forces.

6. An apparatus as in claim 5, wherein the displaceably mounted opposing holder portions of the holder are linked with other portions of the holder by means of joints which permit tilting motions of the displaceably mounted portions of the holder counter to the restoring forces arising when the apparatus is actuated.

* * * * *